Aug. 25, 1959  C. R. SACCHINI  2,901,071
MAKING CLUTCH SPRING ANCHOR PORTIONS
Filed June 7, 1955
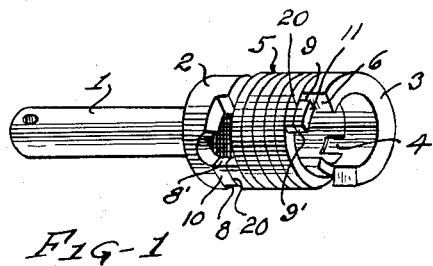
Fig-1
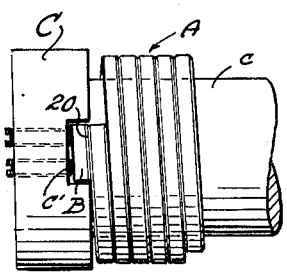
Fig-2
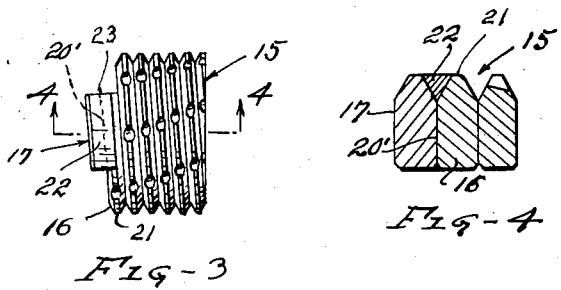
Fig-3  Fig-4
INVENTOR.
Columbus R. Sacchini
BY
ATTORNEY United States Patent Office
2,901,071
Patented Aug. 25, 1959

2,901,071

MAKING CLUTCH SPRING ANCHOR PORTIONS

Columbus R. Sacchini, Willoughby, Ohio, assignor, by mesne assignments, to Curtiss-Wright Corporation, Marquette Metal Products Division, Cleveland, Ohio, a corporation of Delaware Application June 7, 1955, Serial No. 513,737

2 Claims. (Cl. 192—41)

The invention relates to the manufacture of helical, torque transmitting, friction clutch members of the type used in coil clutches or spring clutches and, more specifically, to an improved manner of providing strong and otherwise satisfactory actuating or anchor lugs at one or both ends of the coil members. For convenience these members will be called clutch springs, regardless of the fact that they are frequently used as brakes.

Common practice in making spring clutches is to form the helical members as coil springs from drawn or rolled, spring tempered metal stock or wire of suitable cross-section; and when anchoring or energizing lugs are necessary to proper functioning, those are formed by bending end portions of the coiled stock (called "toes") out of coiled position in the desired direction (e.g. axially or radially of the coil as a whole). The bending usually results in local weakening of the spring stock, as at the base of the toe or lug, and if a toe or lug is so formed on or fairly close to the portion of the spring which will be subjected to highest strain in transmitting torque (high load portion as distinguished from an energizing portion of the spring which never has to withstand very heavy loading), then the toe or lug is very likely to prove to be the weakest or breakdown point in the clutch or brake assembly. When the lug must resist high loading, a more or less suitable, being very expensive, prior practice has been that of attaching a metal block or plate of suitable design and properties to the desired end or ends of the coiled stock by pins or rivets. Brazing and welding of such metal blocks or plates to the coiled spring stock to form high load resisting lugs have been found to be unsatisfactory methods because the high required temperatures (in excess of 1500° F.) deleteriously affect the spring stock either by removing too much spring temper from the stock adjacent the joint, thus impairing wear resistance and load carrying ability of important portions of the spring, or by so affecting the parent metal grain structure as to render high load carrying coil portions of the spring brittle, hence readily subject to fracture during normal use of the mechanism in which the spring is used.

The present specific solution to the above indicated problem is to form the anchoring or actuating lugs by cutting off suitable length pieces of coiled spring stock so coiled or wound as to have face portions conforming substantially to those of the springs to be equipped with the lugs, and lap-joining the pieces to the required spring end portions by silver solder or generally equivalent low temperature bonding alloy utilized in such manner as will insure high resistance to breakage of the joints under applied forces which are peculiar to the operation of spring clutch type mechanisms.

In the accompanying drawing:

Fig. 1 is a perspective view of a typical torque transmitting spring equipped with lugs at both ends, designed to serve in a known design of bidirectional no-back coupling mechanism, also partially shown.

Fig. 2 is a fragmentary elevational view, on a larger scale showing the coiled spring blank and one of the lug forming pieces as located for bonding of it to the associated end of the spring blank.

Fig. 3 is a side elevation of an indexing mechanism clutch spring having an axial anchoring lug secured thereto in accordance therewith at one end.

Fig. 4 is a transverse sectional view of the anchoring lug and adjacent load carrying coil of the Fig. 4 spring, the section being taken as indicated at 4—4 on Fig. 3.

The complete bidirectional no-back coupling, partially shown by Fig. 1, is fully illustrated in an application of C. R. Sacchini et al., Serial No. 433,630, filed June 1, 1954. Rotary input member 1 of that coupling is made in two parts, 2 and 3, keyed together at 4 and loosely supporting between them helical friction spring 5. The spring, for operation, is pre-loaded into a non-rotatable mating drum (not shown hereby) for self energized braking contact therewith to block rotation of an output member (not shown) in either direction except when input torque is being transmitted through the coupling from the input member toward the output member. Circumferentially facing, input-member-supported, shoulders 6, one being shown, act against correspondingly disposed spring-releasing shoulders 8 and 9, formed on lugs 10 and 11 of spring 5, to enable operation of the coupling to transmit torque to the driven member in either direction. Similar shoulders 8' and 9', formed in part by the respective spring lugs 10 and 11 and in part by associated circumferentially facing spring end surfaces flush therewith, are engaged by shoulders (not shown) on a key which is secured to turn with the output member. Such engagement (with shoulders 8' and 9') locks the output member against being turned out of input-member-adjusted position by the connected load. In order to minimize backlash in the coupling all the circumferentially engaging shoulders must be precisely angularly related and the lugs must be subject to as little as possible deflection by tangentially applied shock loading. The bonding joints between the lugs 10 and 11 and the respectively adjacent spring coils are indicated at 20, Fig. 1.

In the case of the indexing mechanism clutch spring 15 of Figs. 3 and 4, its anchoring lug 17 fits into an axial socket in a helix plate (not shown) of a single internal drum or "single pocket" type of spring clutch assembly (many examples known). In that type of spring clutch assembly the end coil 16 which carries the anchor lug 17 is subjected to the highest clutching pressures (higher than the other coils), hence the lug 17 must transmit the maximum torque or load to be delivered by the clutch. Lug 17 is bonded to the adjacent coil 16 at joint 20' as will be more fully described below. The coil stock section of Fig. 4, before coiling, is of so called "high crown keystone" sectional shape, and the V-shaped groove between the relatively narrow external clutching surface portion 21 of coil 16 and the lug 17 is filled in with bonding metal at 22, mainly to provide an uninterrupted circumferentially facing shoulder surface 23 for full face abutment with the main helix plate shoulder (not shown) and to provide uninterrupted radially outwardly exposed drum-contacting surfaces on the lug. The peripheral surface portions of the lug 17 are ground smooth, removing excess bonding metal, during final finish of the spring accurately to prescribed dimensions.

When the lugs 10, 11 and 17 of the proportions shown are attached to the adjacent spring end coils as illustrated, and the springs operate to transmit torque, the bonded joints 20 or 20' will be subjected almost entirely to shearing stress, since the forces applied to the inherently stiff lugs are tangentially of the associated spring coils. That is equally true if the lugs are secured to radially exposed face portions of the coils so as to extend outwardly or inwardly of such coils (not illustrated, but contemplated hereby). When the silver solder bonding of the lug and spring stock is done as described below and the lugs and springs are properly designed, as to composition, cross section, number of coils and the rest, no failures have been found to occur notwithstanding extremely high shock loading.

Clutch spring stock on the order of SAE 1060 to 1065, die drawn, oil tempered steel, and so called chrome vanadium alloy (e.g. 6150) is customarily tempered before coiling to obtain hardness readings of from about 43 to about 48, Rockwell C. It is known or recognized, specifically in reference to silver alloy bonding of metal surfaces that, when the parent metals are relatively hard, maximum resistance to disruption of joints by applied shearing forces can be had with thicker films of silver solder between the parent metal faces than would be most suitable in case the forces which tend to break the joints apart act to subject the bonding metal mainly to tension. Accordingly, in the practice of the present invention, the metal faces of the spring and lug stock, instead of being cleaned by burnishing and/or chemical treatment (thorough cleaning by some suitable method being necessary shortly before bonding to insure complete "wetting" by fused bonding metal) are cleaned by abrasive grit blast treatment. The preferred uniform surface "roughness" obtained by sharp sand or flint blasting is from 35 to 42 microinch root-mean-square average which is approximately equivalent to a rough grinding finish. The treatment produces locking tooth faces (to be embedded by the bonding film), a large proportion of which faces will be so disposed as to tend, through the intermediary of the bonding film metal, mechanically to resist shearing forces which, in the operation of the clutch, are oriented with the longitudinal axis of the spring and lug stock as drawn or rolled to shape. Grooving of the metal spring stock such as is usually effected either by the drawing dies or by the coiling fixtures is lengthwise of the stock; hence that grooving, when present, does not tend to resist joint-metal-shearing force applied to the lugs circumferentially of the coils.

Additionally, the slight roughening of the spring and lug side faces, produced by approximately uniform and otherwise suitable grit blasting treatment, establishes a bonding metal reception channel between the juxtaposed spring and lug surfaces of varying dimensions normal to those surfaces, from infinitely small to as large as may be needed. Thus the abrasive grit blast treatment serves to insure the retention of slightly open channels of controllable width or thickness between the juxtaposed lug and spring stock surfaces for reception of the bonding metal, regardless of how firmly said surfaces may be pressed together in the positioning fixtures for the parts; whereas, when both the spring and lug faces to be joined are substantially smooth and of substantially identical contour, an inadequate channel width for reception of the bonding metal can occur through use of too much force on the pieces toward each other during application of bonding heat.

It is, of course, apparent that disc or wheel grinding of the joint-involving spring and lug surfaces, prior to silver solder bonding, in such manner that all or a large part of the resulting grooves in the joint forming faces extend generally crosswise of the longitudinal axis of the stock used to form the springs and lugs would have the same shear-force-resisting effect and the rest as the preferred abrasive grit blasting treatment described above; but such grinding would be many many times as expensive to practice.

In case the lugs are to extend axially of the springs, i.e. as shown hereby, then a simple manner of insuring an approximate mating or conformance of the lug and spring stock surfaces to be joined is to form the lugs from stock (preferably same composition as the spring stock) coiled on the same radius and pitch as the spring blank has.

When the lugs are to extend radially of the clutch spring end coils, then the lug-blank-forming spring stock is coiled on radii appropriately less than or more than the coiling radii of the clutch spring stock, depending upon whether the lugs are to extend toward or away from the clutch spring axis.

Referring to Fig. 2, the spring blank A and the lug blank B are suitably positioned, as by hand, on a supporting mandrel C having a cylindrical shank $c$ and shoulder surfaces $c'$ for abutting the lug blank, so that the matching faces of the spring and lug to be joined are properly registered and in relatively light contact. Mechanical registering means and pressure controlling means, not shown, may be suitably incorporated in the mandrel construction. Bond metal fusing heat can be applied, as by a torch, and, in such case, the flame is preferably applied to the lug blank, since retention of critical physical properties of the lug is less important than is true of the spring per se. The bonding metal, not shown, is fed to or prepositioned on the joint region in any convenient manner, and the heat absorbed by the parts causes the bonding metal to flow into and substantially fill the interface channel, all essential as usual in successful silver soldering practice.

If the bonding metal is hand fed, then when the spring blank A with its now attached lug blank B is removed from the mandrel it is beneficial to apply further bandmetal-fusing heat around the portion of the joint which is exposed inside the spring coils. Quenching (e.g. oil quench) is done a few seconds after the joining operation has been completed.

With clutch springs composed as earlier above mentioned, and by proceeding with lug attachment as described above, very strong and uniform joints such as 20 and 20' are secured through the use of U.S. Government Specification QQ–S–561D grade 7 silver solder and QQ–S–561D grade 4 silver solder. These contain, respectively, 45% and 50% silver and flow respectively at 1145° F. and 1175° F. The hardness and spring temper of the spring stock closely adjacent the joints 20 and 20' are never materially modified by the applied bond metal fusion heat if the joining is done as herein described. The spring hardness close to the lug is lowered less than one point, Rockwell C, a negligible amount for helical clutch springs.

The length of the lugs 20 and 20', i.e. distance of extent around the coil, in most cases, is at least twice the smallest dimension of the spring stock section; and since by cutting the lugs from coiled stock gives them the same pitch as any coil similarly wound, the making of the lugs from coiled stock essentially similar to that used for the main coils has the advantage of enabling economical provision of clutch spring lugs fully mating the spring stock and of any desired extent around the adjacent coil, and economical provision of circumferentially spaced opposed shoulders (e.g. 8 and 8' Fig. 1) of any desired angular spacing.

The use of cut sections of spring stock to form the lugs, as illustrated, has the advantage of enabling true axial alignment of the lugs with the main coils of the spring, when that position is required, whereas, in the making of lugs as bent out toe portions of the spring stock, securing of true axial alignment and any other precise location, e.g. truly radially of the coil, requires great care and is timestaking since the stock, if of relatively large section, has to be heated before the bending operation can be safely performed.

Further, the lugs, provided as described above, can be accurately shoulder-finished (e.g. shoulders 8, 9 etc.) without removal of metal necessary to support them against deflection in service (which cannot be done with simple bent-out-toe-formed lugs); and the present subject lugs can be fully finished on their radially exposed faces (internally and externally of the associated springs) when the springs are internally and/or externally machined to precise dimensions. All such machining is done after the lugs are bonded in place, and that usually makes it unnecessary to perform any special operation to remove projecting or excess bonding metal (fin or flash effects).

The coil size modifying operation known as heat setting, commonly used in the manufacture of helical clutch springs as a final operation, requires less than 400° F. temperature application to the springs, and this does not, of course, adversely affect the silver soldered joints.

I claim:

1. The method of providing a high torque transmitting anchor or actuator lug on an end portion of a helical clutch spring coiled from elongated spring tempered ferrous metal stock having a generally smooth side-defining face portion which is exposed at or near one end of the coil, shaping a lug blank from an elongated piece of ferrous metal stock by coiling of spring stock in substantial conformity to the surface portion of clutch spring to which the lug is to be applied, and cutting the lug blank from coil stock so that the lug blank has a face portion approximately conforming to said exposed face portion on the coil, and bonding the lug to the coil at and through the mutually conforming face portions and in lengthwise parallel relationship with a fused relatively thin film of bonding metal the fusion temperature of which is below such temperature as would normally adversely affect the strength of the metal spring stock when applied thereto to effect fusion.

2. In combination, a clutch or brake member coiled from spring tempered helical metal spring stock of generally rectangular cross section, said member being adapted to transmit torque when its coils are in frictional mating contact with a mating circular drum surface, and an anchor or actuator lug for the spring member at one end thereof, the lug comprising an elongated metal block which is a cut off piece of metal stock of generally rectangular cross section and which has been coiled in such manner in relation to the coiled form of said spring member as to provide at least one side defining face portion on the block conforming substantially exactly to a side defining face portion of said spring member, the block being longer than the principal transverse dimension of the stock from which cut, the block and spring member being permanently joined together in mutually parallel lengthwise relationship at their substantially mutually conforming face portions by a fused film of metal the fusion temperature of which is below such temperature as would normally adversely affect the strength of metal spring stock when applied thereto to effect fusion.

References Cited in the file of this patent
UNITED STATES PATENTS

| | | |
|---|---|---|
| 1,605,601 | Mougey | Nov. 2, 1926 |
| 1,761,518 | Chryst | June 3, 1930 |
| 1,935,147 | Drexler | Nov. 14, 1933 |
| 2,044,420 | Collyear | June 16, 1936 |
| 2,220,857 | Weber | Nov. 5, 1940 |
| 2,421,814 | Starkey | June 10, 1947 |
| 2,479,965 | Ragsdale | Aug. 23, 1949 |
| 2,523,151 | Schneider et al. | Sept. 19, 1950 |
| 2,643,749 | Greenlee | June 30, 1953 |
| 2,668,347 | Gorske | Feb. 9, 1954 |
| 2,705,065 | Kloss | Mar. 29, 1955 |